United States Patent
Zigmond et al.

(10) Patent No.: US 9,369,355 B1
(45) Date of Patent: Jun. 14, 2016

(54) CONSUMPTION TIME ESTIMATION FOR ONLINE MEDIA ITEMS WITH JITTERED EVENT LOG SCHEDULES

(71) Applicant: GOOGLE INC., Mountain View, CA (US)

(72) Inventors: Daniel John Zigmond, Menlo Park, CA (US); Andy Chu-I Yu, Mountain View, CA (US); Mike Danilov, Mountain View, CA (US); Vasyl Pihur, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 544 days.

(21) Appl. No.: 13/838,532

(22) Filed: Mar. 15, 2013

(51) Int. Cl.
  *H04L 12/26* (2006.01)
  *H04H 60/43* (2008.01)
  *H04N 21/442* (2011.01)

(52) U.S. Cl.
  CPC .............. *H04L 43/04* (2013.01); *H04H 60/43* (2013.01); *H04N 21/44222* (2013.01)

(58) Field of Classification Search
  CPC ....... G06F 3/05; G06F 11/3082; G06F 11/34; G06F 17/30864; G06F 17/30398; H04L 43/04; H04H 60/43; H04N 21/44222; G06Q 30/02
  USPC ........ 709/219, 224, 231; 725/29; 705/52, 418
  See application file for complete search history.

(56) References Cited

U.S. PATENT DOCUMENTS

| | | | |
|---|---|---|---|
| 2006/0075420 A1* | 4/2006 | Ludvig .................. | H04H 60/32 725/9 |
| 2008/0139196 A1* | 6/2008 | Zhang et al. ................... | 455/423 |
| 2008/0270598 A1* | 10/2008 | Chen ...................... | G06Q 30/02 709/224 |
| 2010/0318544 A1* | 12/2010 | Nicolov ............ | G06F 17/30035 707/759 |
| 2011/0314039 A1* | 12/2011 | Zheleva et al. ................ | 707/767 |
| 2012/0278331 A1* | 11/2012 | Campbell et al. ............. | 707/740 |
| 2013/0163759 A1* | 6/2013 | Harrison et al. ............... | 380/268 |
| 2013/0276129 A1* | 10/2013 | Nelson ............... | H04N 21/8133 726/26 |

* cited by examiner

*Primary Examiner* — Thomas Dailey
*Assistant Examiner* — Aye M Aung
(74) *Attorney, Agent, or Firm* — Lowenstein Sandler LLP

(57) ABSTRACT

A server computer system receives event logs from one or more client devices for multiple consumption sessions of an online media item. The event logs are received based on random schedules. The system determines, for various times, a first number of consumption sessions during which an event log is scheduled to be sent at the corresponding times. The system determines, for the various times, a second number of consumption sessions during which an event log was sent to the server computer system at the corresponding times. The determinations being based on the event logs. The system determine, for each of the times, a probability that consumption time for the online media item is the corresponding time or less. The determination is based on the first number and the second number. The system determines consumption time metrics for the online media item based the probabilities for the plurality of times.

20 Claims, 6 Drawing Sheets

CONSUMPTION TIME ESTIMATION FOR ONLINE MEDIA ITEMS WITH JITTERED EVENT LOG SCHEDULES

TECHNICAL FIELD

The present disclosure relates to consuming online media items and, more particularly, to a technique of determining estimated consumption time for online media items using jittered event log schedules.

BACKGROUND

There can be various types of media, such as offline media and online media. One example of online media is Internet media, such as digital video, digital movies, digital photos, digital music, website content, social media updates, etc. Consumption time is the time one or more client devices (e.g., media player) spend consuming (e.g., playing) an online media item. Traditionally, consumption time has been measured based on small logging events, also known as "pings", which are sent by the client devices to a server while an online media item is being consumed. Conventional solutions configure a client device to use a static schedule for sending an event log to the server at fixed times during the playback of the online media item. Generally, client devices that consume the same online media item (e.g., "Video-1") use the same schedule. For example, all client devices may send the first three event logs based on a ten second interval and then send additional event logs based on a forty second interval. For example, Device-1 may be playing Video-1 and may send a first event log at ten seconds, a second event log at twenty seconds, a third event log at thirty seconds, and a fourth event log at seventy seconds. Device-1 may stop playing Video-1 at eighty seconds and may not send any other event logs to the server after the fourth event log. The server can use the event logs that are received from Device-1 to determine that Device-1 was playing Video-1 for at least seventy seconds.

Device-2 may also be playing Video-1 and may have also sent event logs to the server using the same schedule as Device-1, but may have stopped playing Video-1 at thirty-five seconds. The server may have received three event logs from Device-2. With conventional solutions, the server can determine that Device-2 played Video-1 for at least thirty seconds but less than seventy seconds, since the server did not receive an event log from Device-2 at seventy seconds. Traditional solutions tend to underestimate the actual consumption time for an online media item.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later. A method and system to determine estimated consumption time for online media items using random event log schedules is described. The method includes receiving event logs from one or more client devices for multiple consumption sessions of an online media item. The event logs are received based on random schedules. The method includes determining, for various times, a first number of consumption sessions during which an event log is scheduled to be sent at corresponding times. The determination is based on the event logs. The method includes determining, for the various times, a second number of consumption sessions during which an event log was sent to the server computer system at the corresponding times. The determination is based on the event logs. The method further includes determining, for each of the times, a probability that consumption time for the online media item is the corresponding time or less. The determination is based on the first number and the second number. The system determines consumption time metrics for the online media item based the probabilities for the plurality of times.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
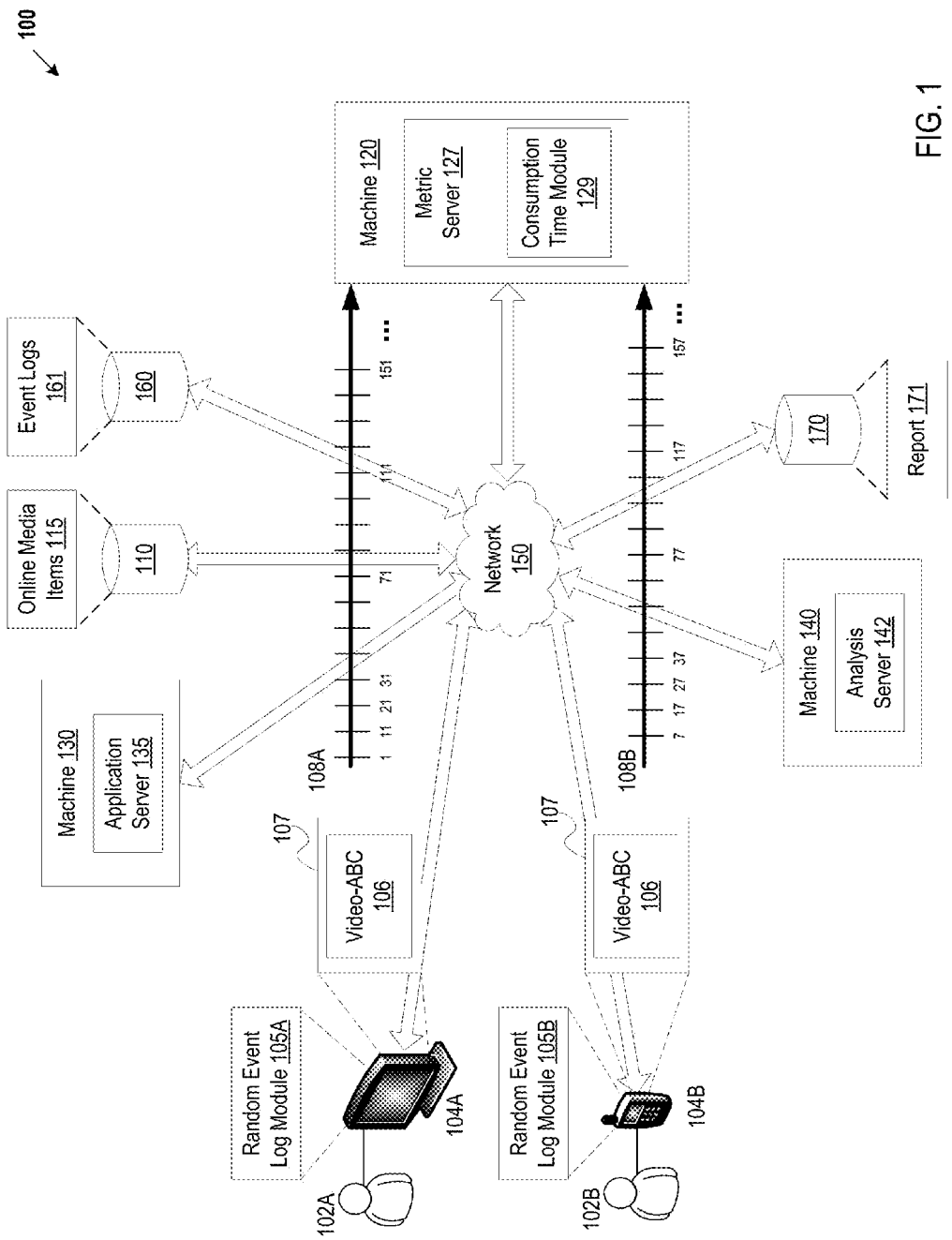
FIG. 1 illustrates example system architecture, in accordance with various implementations of the present disclosure.

A system and method for determining one or more consumption time metrics for an online media item using random event log schedules is described. Consumption time is the time one or more client devices spend consuming an online media item, according to various implementations. As used herein, "media," media item," "online media item," "digital media," and a "digital media item" can include an electronic file that can be executed or loaded using software, firmware or hardware configured to present the digital media item to an entity. An entity can be a user, a group of users, a business organization such as a corporation, an educational institution such as a college and university, etc. Examples of an online media item can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. An online media item can be a media item consumed via the Internet and/or via a mobile device application.

For brevity and simplicity, an online video (also hereinafter referred to as a video) is used as an example of an online media item throughout this document. Consuming an online media item can include, for example, and is not limited to, playing an online media item, editing an online media item, presenting an online media item, etc. For example, a client device may play an online video, edit an online photo, play online music, present an Internet blog, etc. Consumption time can account for pause time.

A "consumption session" hereinafter refers to an instance of an online media item (e.g., Video-ABC) being consumed. For example, a client device may consume the same online media item multiple times, which results in multiple consumption sessions. For example, client device may consume Video-ABC seven times, which results in seven consumption sessions. In another example, the online media item may be consumed by multiple client devices, which may result in multiple consumption sessions. For example, Client-Device-A may consume Video-ABC three times and Client-Device-B may consume Video-ABC one time, which results in four consumption sessions for Video-ABC.

Implementations of the present disclosure use random event log schedules, rather than static event log schedules, to determine one or more consumption time metrics (e.g. average consumption time) for online media items. A static event log schedule sends event logs at pre-defined intervals. For example, a static event log schedule may send an event log at ten seconds, twenty seconds, thirty seconds, seventy seconds, one hundred ten seconds, etc. A random event log schedule has no pre-defined intervals and can send event logs randomly. One advantage in using a random event log schedule is that there is guarantee that at least one event log will be sent/received. For example, if the static schedule is to send the first event log at ten seconds and the online media item is watched by Device-1 for five seconds and Device-2 for eight seconds, then neither Device-1 nor Device-2 will send out a first event log. In a random event log schedule, Device-1 may send out a first event log at two seconds and Device-2 may send out a first event log at six seconds. A server can receive sets of event logs for a large number of consumption sessions of the same online media item from one or more client devices according to random schedules, while the client devices are consuming the online media item. The receipt of an event log from a client device can be an indication that the client device is consuming the online media at least up until the point in time of when the event log was sent by the client device. The server can aggregate data from the sets of event logs, determine the probability of consumption time of t seconds or less, for example, by estimating the value of CDF (cumulative distribution function) for a particular online media item for various seconds, and can determine an average consumption time for the online media item using the estimated values of CDF. For example, the probability that Video-ABC has a consumption time t of forty-eight seconds or less may be F(48)=20%, the probability that Video-ABC has a consumption time t of sixty-one seconds or less may be F(61)=50%, and the probability that Video-ABC has a consumption time of seventy seconds or less may be F(70)=80%. Unlike a static event log schedule, a random event log schedule allows the server to determine the probabilities of consumption time being t seconds or less for each session. Implementations can estimate aggregate CDF without having accurate measurements of consumption time for the individual consumption sessions.

FIG. 1 illustrates an example system architecture 100 in which examples of the present disclosure can be implemented. The system architecture 100 can include one or more client devices 104A-B, one or more machines 120,130,140 and one or more data stores 110,160 coupled to each other over a network 150. Network 150 may be a public network (e.g., the Internet), a private network (e.g., a local area network (LAN) or wide area network (WAN)), or a combination thereof. One or more data stores 110 can store online media items. For example, the data store 110 may store an online media item 115 named Video-ABC. The client devices 104A-B can be cellular telephones, personal digital assistants (PDAs), portable media players, netbooks, laptop computers, electronic book readers, tablet computers, desktop computers, set-top boxes, gaming consoles, televisions, etc.

Various entities 102A-B (e.g., users) can use one or more client devices 104A-B to consume an online media item. The client devices 104A-B can consume the same online media item, for example, Video-ABC 106. The client devices 104A-B can run an operating system (OS) that manages hardware and software of the client devices 104A-B. An application 107 can run on the client devices 104A-B (e.g., on the OS of the client devices). An application 107 can be any type of application including, for example, a web application, a desktop application, a browser application, a mobile device application (e.g., smart phone application, media player application, tablet device application, etc.), or similar application, etc.

The client devices 104A-B can consume an online media item via the application 107. For example, the application 107 can access online media items in data store 110 served by an application server 135 hosted by the machine 130. The machine 130 can host an application server 135 to provide web applications, mobile device applications, desktop applications, and data (e.g., online media items) for the applications.

For each consumption session for an online media item (e.g., Video-ABC 106), the corresponding client device can include a random event log module 105A-B to create and send a set of event logs 161 for a consumption session of the online media item (e.g., Video-ABC 106) to a consumption time module 129. The consumption time module 129 can be in a metric server 127 in the machine 120. The random event log module 105A-B can send the sets of event logs 161 to the consumption time module 129 using random schedules 108A-B. For example, the random schedule 108A may indicate that an event log should be sent to the consumption time module 129 at one second, eleven seconds, twenty-one seconds, thirty-one seconds, seventy-one seconds, one hundred eleven seconds, one hundred fifty-one seconds, etc. In another example, the random schedule 108B may indicate that an event log should be sent to the consumption time module 129 at seven seconds, seventeen seconds, twenty-seven seconds, thirty-seven seconds, seventy-seven seconds, one hundred seventeen seconds, one hundred fifty-seven seconds, etc. The random schedule 108A used by random event log module 105A is different from random schedule 108B used by random event log module 105B. In one implementation, the random event log module 105A uses a random schedule that is different for each consumption session associated with the random event log module 105A.

The random event log module 105A-B can add randomness to a schedule. "Randomness" and "jitter" hereinafter refers to shift in pattern or predictability in events. One implementation of sending event logs using random schedules is described in greater detail below in conjunction with FIG. 2. In one implementation, the random event log module 105A-B is part of an application (e.g., web application, mobile application, desktop application). In one implementation, the random event log module is separate from an application and executed to interface with the application.

A 'set' can include one or more event logs depending on how long the online media item is being consumed and on the schedule for the client device to send the event logs 161 to the server. For example, if the schedule 108B indicates that the client device 104B should send the first event log at seven seconds and the second event log at seventeen seconds, and the client device 104B consumes Video-ABC 106 for fifteen seconds, then the client device 104B may send only the first event log at seven seconds and not the second event log.

One or more machines 120 can include a metric server 127 to collect the sets of event logs 161 from the client devices 104A-B. The consumption time module 129 can store the received event logs 161 in a data store 160 that is coupled to the consumption time module 129. An event log can include data, such as, and not limited to, an identifier of the online media item, the time the event log was sent, the time the next event log is scheduled to be sent, identifiers of the segments of the online media item that were consumed since the preceding event log was sent, and links to the segments of the online media item that were consumed since the preceding event log was sent, etc. In one implementation, one or more event logs in a set can include a geographic location identifier associated with the client device, a device platform identifier associated with the client device, and an operating system identifier associated with the client device.

Certain data in the event logs 161 may be treated in one or more ways before it is stored or used, so that personally identifiable information is removed. Implementations can treat an identity of an entity (e.g., user) so that no personally identifiable information can be determined for the entity and determine one or more consumption time metrics related to entities. Implementations can generalize the geographic location of an entity and/or client device where location information is obtained (such as to a city, ZIP code, or state level), so that a particular location of an entity and/or client device cannot be determined.

In the instance where an entity consents to the use of such data in the event logs 161, the data may be used for determining one or more consumption time metrics (e.g., average consumption time) for an online media item from estimated values of CDF (cumulative distribution function) at times without having accurate measurements of individual consumption sessions. The consumption time module 129 can receive sets of event logs 161 for a particular online media item from multiple consumption sessions, aggregate data from the sets of event logs, and determine the probabilities of consumption time of t seconds or less for the online media item at various times. The consumption time module 129 can determine the probabilities by determining the value of the CDF (cumulative distribution function) at time t for the online media item for various times using the data aggregated from the sets of event logs. The cumulative distribution function is:

$$F(x)=P(X \leq x) \qquad \text{Equation 1}$$

where the right-hand side of Equation 1 represents the probability that a random variable X (e.g., consumption time of an individual session) takes on a value less than or equal to x. Time can be represented by t. In one implementation, t is represented in seconds. The consumption time module 129 can receive sets of event logs for a number $N(t)>0$ of consumption sessions. N(t) is the number of consumption sessions that are scheduled to send an event log at time t if a consumption session progresses to time t. N(t) can be determined from aggregating the consumption sessions based on time t for the various seconds. N(t) can be determined from the event logs. Each event log can include the time the event log was sent and the time the next event log is scheduled to be sent. For example, Eventlog-1 may be sent at two seconds and can include information that the next event log (e.g., Eventlog-2) is scheduled to be sent at five seconds. Eventlog-2 may or may be sent at five seconds depending on whether the consumption session ends before five seconds. S(t) is the number of consumption sessions that have actually progressed to time t. S(t) can be determined from the event logs. Each event log can include the time the event log was sent. S(t) can be determined from aggregating the consumption sessions that have progressed to time t for the various seconds. Having the event log times jittered ensures that for every value of t, N(t) will be greater than zero, as opposed to non-jittered schedules for which N(t) may be zero (e.g., N(13)=0). The consumption time module 129 can use the aggregated data (e.g., N(t), S(t)) to estimate the value of CDF of consumption time at time t at various times as the following:

$$F(t)=\text{Prob}(\text{time } T \leq t)=1-S(t)/N(t) \qquad \text{Equation 2}$$

Figure 2:
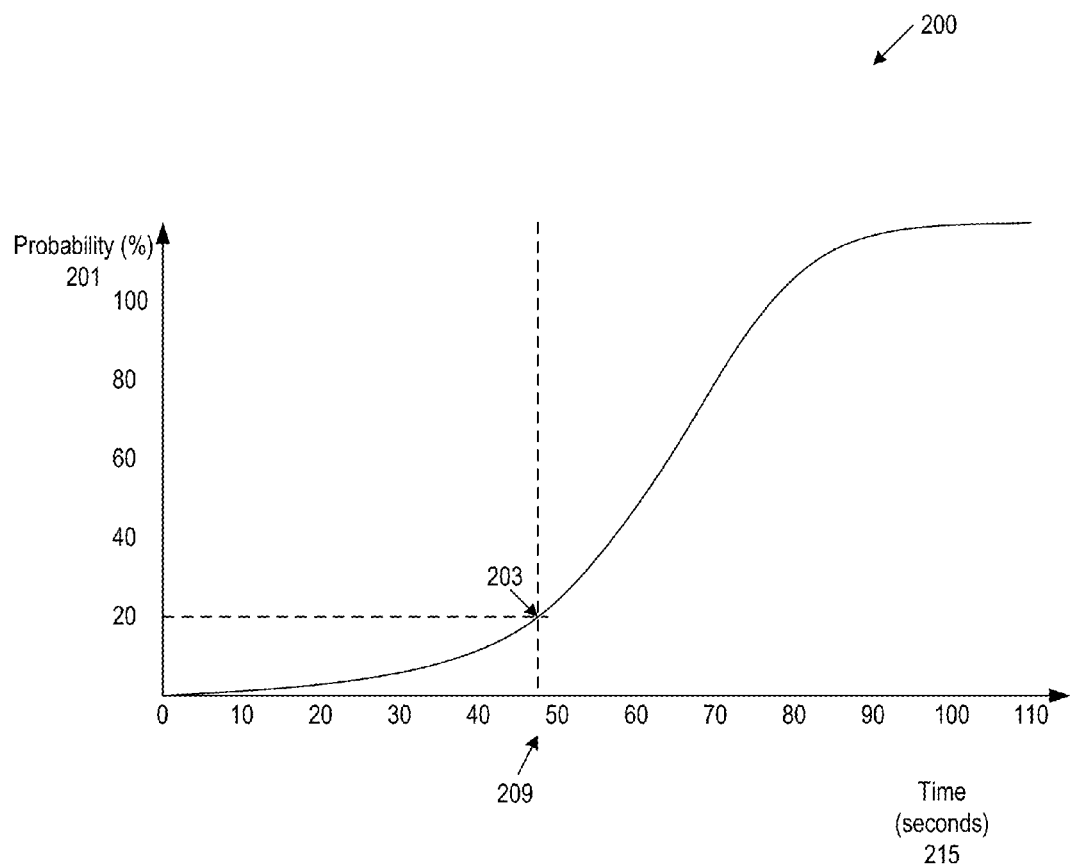
FIG. 2 an example of values of the cumulative distribution function (CDF) at various seconds for an online media item, according to various implementations.

FIG. 2 illustrates an example of values of CDF at t seconds for an online media item, according to various implementations. The x-axis 215 can represent time t in seconds and the y-axis 201 can represent probability in percentages. For example, the probability that Video-ABC has a consumption time of forty-eight seconds (209) or less may be the CDF value of F(48)=20% (203). The server can use F(t) to determine one or more metrics (e.g., average consumption time) for the online media item.

Returning to FIG. 1, the consumption time module 129 can determine one or more consumption time metrics (e.g., average consumption time) for the online media item using the probabilities (e.g., values of CDF). For example, the consumption time module 129 may determine that Video-ABC 106 has an average consumption time of thirty-seven seconds. The consumption time module 129 can send the one or more consumption time metrics to one or more analysis servers 142 hosted in one or more machines 140. The analysis server 142 may use the one or more consumption time metrics to create and store a report 171 in one or more data stores 170 that are coupled to the analysis server 142. For example, the average consumption time can be used in determining revenue per consumption time, in editing online media item, in recommending online media items, etc.

The machines 120,130,140 can collect demographic information pertaining to groups of entities (e.g., age of entity groups, geography (e.g., country, state, city) and/or client devices 104A-B, and store the entity information in one or more data stores 110,160,170. In situations in which the systems discussed here collect personal information about entities, or may make use of personal information, the entities may be provided with an opportunity to control whether programs or features collect entity information (e.g., information about an entity's social network, social actions or activities, profession, an entity's preferences, or an entity's current location), or to control whether and/or how to receive content from the content server that may be more relevant to the entity. In addition, certain data may be treated in one or more ways before it is stored or used, so that personally identifiable information is removed. For example, an entity's identity may be treated so that no personally identifiable information can be determined for the entity or an entity's geographic location may be generalized where location information is obtained, so that a particular location of an entity cannot be determined. Thus, the entity may have control over how information is collected about the entity and used by a (e.g., metric server 127, analysis server 142, application server 135).

The machines 120,130,140 can be a rackmount server computer, a router computer, a personal computer, a portable digital assistant, a mobile phone, a laptop computer, a tablet computer, a netbook, a desktop computer, a media center, or any combination of the above. A data store 110,160,170 can be a persistent storage that is capable of storing data. As will be appreciated by those skilled in the art, in some implementations data store 110,160,170 might be a network-attached file server, while in other implementations data store 110,160, 170 might be some other type of persistent storage such as an object-oriented database, a relational database, and so forth.

Figure 3:
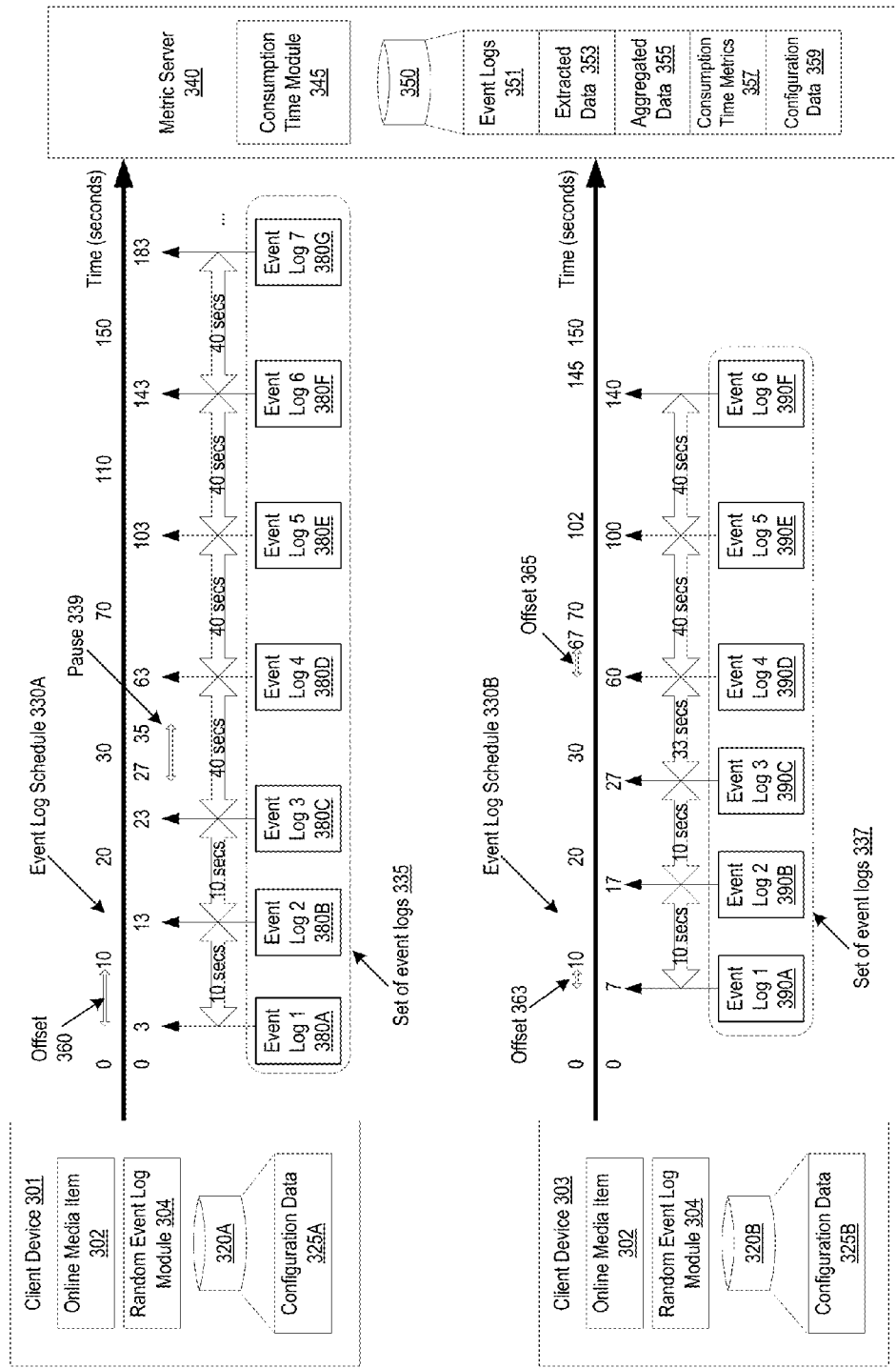
FIG. 3 is a block diagram of random event log modules and a consumption time module for determining estimated consumption time using random event log schedules, in accordance with various implementations.

FIG. 3 is a block diagram of random event log modules 304 in client devices 301,303 and a consumption time module 345 in a metric server 340, according to various implementations. The metric server 340 can be hosted in a machine (e.g., machine 120 in FIG. 1). The random event log module 304 can correspond to the random event log module 121 hosted by a client device 104A-D of FIG. 1. The consumption time module 345 can correspond to the consumption time module 129 hosted by a machine 120 of FIG. 1.

The client devices 301,303 can start consuming an online media item 302, and the corresponding random event log module 304 can send a set of event logs to the consumption time module 345 during consumption of the online media item 302. The random event log module 304 can identify a schedule that should be used for sending the event logs to the consumption time module 345. The schedule can be stored as part of configuration data 325A-B that is stored in a data store 320A-B that is coupled to the random event log module 304. The schedule can be a pre-defined and/or user (e.g., system administrator) defined schedule. The schedule can be received from a server (e.g., metric server 340).

The random event log module 304 can add randomness (jitter) to the schedule. Jitter and randomness can be a deviation from an expected periodicity. For example, a schedule without jitter may be that the client device 301,303 should send the first three event logs every ten seconds, and should send additional event logs every forty seconds. An example of a schedule with jitter may be schedule 330A where the random event log module 304 may add an offset 360 to the start time for sending the first event log 380A. Another example of a schedule with jitter may be schedule 330B where the random event log module 304 may add an offset 363 to the start time for sending a first event log 390B and may add an offset 365 to the time for sending the fourth event log 390D. The random event log module 304 can add one or more types of jitter to a schedule. For each consumption session, the random event log module 304 can add different types of jitter to the schedule. For example, client device 301 may consume Video-ABC three times, and the jitter that is added to the schedule for each consumption session may be different.

The random event log module 304 can determine the one or more types of jitter to add to the schedule based on the configuration data 325A-B. The configuration data 325A-B can be pre-defined and/or user (e.g., system administrator) defined. Examples of types of jitter that can be added to a schedule can include, and are not limited to, an offset to the start of the first period, an offset to the start of second period, an offset for each event log, an offset for one or more of the event logs, or any combination of such. For example, the random event log module 304 in client device 301 may add jitter to event log schedule 330A for client device 301 by adding an offset 360 of minus seven seconds to the start of the first period. For example, the first event log 380A may be sent at three seconds, instead of ten seconds, which may result in the second event log 380B being sent at thirteen seconds, and the third event log 380C being sent at twenty-three seconds. The fourth event log 380D may be sent forty seconds later at sixty-three seconds, the fifth event log 380E may be sent at one hundred three seconds, the sixth event log 380F may be sent at one hundred forty three seconds, and the seventh event log 380G may be sent at one hundred eighty-three seconds.

The random event log module 304 can include a random value generator to generate offset values. The jitter offset values can be the same value or different values. In one implementation, the configuration data 325A-B can include parameters for the random value generator. For example, a parameter may be that the offset value for the start time for sending a first event log should be no more than ten seconds.

The types of jitter can be a combination of offsets. For example, event log schedule 330B may include offset 363 to the first event log 390A and another offset 365 of minus seven seconds to the start of the second period. For example, instead of starting the second period forty seconds after the third event log 390C, which would have been at sixty-seven seconds, the random event log module 304 may add jitter to schedule 330B to start the second period at sixty seconds. For example, the fourth event log 390D may be sent at sixty seconds, the fifth event log 390E may be sent at one hundred seconds, and the sixth event log 390F may be sent at one hundred forty seconds.

The consumption time module 340 can receive sets 335, 337 of event logs for the online media item 302 for multiple consumption sessions and can store the event logs 351 in a data store 350 that is coupled to the consumption time module 345. The data store 350 can store event logs for one or more online media items. The event logs 351 can include, for example, and not limited to, an identifier of the online media item, the time the event log was sent, the time the next event log is scheduled to be sent, identifiers of the segments of the online media item that were consumed since the preceding event log was sent, number of segments length of time for each of those segments, links to the segments, geographic identifier associated with the client device, device platform identifier, operating system, etc. The online media items (e.g., online media item 302) can be segmented. The segments can have identifiers. For example, Video-ABC may be segmented into one-second segments. A user may be watching Video-ABC and the client device may have sent a first event log at ten seconds and a second event log a twenty seconds. At twenty-two seconds, the user may pause Video-ABC and may resume playing Video-ABC at thirty seconds. Between twenty and thirty seconds, the client device may have consumed Video-ABC for two seconds and paused Video-ABC for eight seconds. The client device may send a third event log at thirty seconds which contains the segments identifiers that were consumed for the two seconds and links to those segments.

For each consumption session of an online media item 302, the client devices 301,303 send a set of event logs. For the individual sets of event logs, the consumption time module 345 can parse the set of event logs, search for particular data items in set of the event logs, and extract the particular data items from set of the event logs based on the configuration data 359. The configuration data 359 can specify which terms to search for and which data items to extract from the set of event logs. Examples of the extracted data 353 can include, and are not limited to, identifier of the online media item, the time the event log was sent, the time the next event log is scheduled to be sent, number of segments of the online media item that were consumed since the preceding event log was sent, identifiers of those segments, links to those segments, length of time for each of those segments, geographic location identifier associated with the client device, device platform identifier, operating system, etc. The extracted data 353 may be stored as a database.

The consumption time module 345 can aggregate portions of the extracted data 353 to determine N(t), the number of consumption sessions that are schedules to send an event log at time t if the consumption session progresses to time t, and S(t), the number of consumption sessions that have actually progressed to time t and sent a corresponding event log. N(t) and S(t) can be determined from the event logs. Each event log can include the time the event log was sent and the time the next event log is scheduled to be sent. For example, Eventlog-1 may be sent at five seconds and can include information that the next event log (e.g., Eventlog-2) is scheduled to be sent at eight seconds. Eventlog-2 may or may be sent at eight seconds depending on whether the consumption session progresses to eight seconds.

The extracted data 353 can reflect pause time. For example, the online media item 302 may be segmented into 1-second segments. During consumption of the online media item 302, the client device 301 may have paused consumption at twenty-seven seconds and may have resumed consumption at thirty-five seconds. There may be a pause 339 of eight seconds. For set 335, the first event log 380A may have included three 1-second segments that were consumed, the second event log 380B may have included ten 1-second segments, and the third event log 380C may have included ten 1-second segments. The fourth event log 380D may have included thirty-two 1-second segments to account for the eight-second pause 339. The fifth event log 380E may have included forty 1-second segments, the sixth event log 380F may have included forty 1-second segments, and the seventh event log 380F may have included forty 1-second segments.

The aggregated data 335 can be stored in the data store 350. The consumption time module 345 can determine the probabilities of consumption time of t seconds or less for the online media item 302 using the aggregated data 355. The consumption time module 345 can determine the probabilities of consumption time of t seconds or less by determining the value of CDF at t for various t using the aggregated data 335 (e.g., N(t) for various t, S(t) for various t). The consumption time module 345 can create one or more consumption time metrics for the online media item using the probabilities. For example, the consumption time module 345 may determine an average consumption time for the online media item 302.

The consumption time module 345 can determine the consumption time metrics 357 for an online media item 302 periodically. The period can be based on configuration data 359 that is stored in a data store 350 that is coupled to the consumption time module 340. For example, the consumption time module 340 can determine the consumption time metrics once a day. The period can be a configurable value. The period can be a user-defined value. The consumption time module 345 can store the consumption time metrics 357 in the data store 350. The consumption time module 345 can provide the consumption time metrics 357 to one or more systems (e.g., reporting system, analysis system, etc.), which may use the consumption time metrics 357 for one or more analyses. For example, the average consumption time can be used in determining revenue per consumption time, in editing online media item, in recommending online media items, etc.

The data stores 320A-B,350 can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

Figure 4:
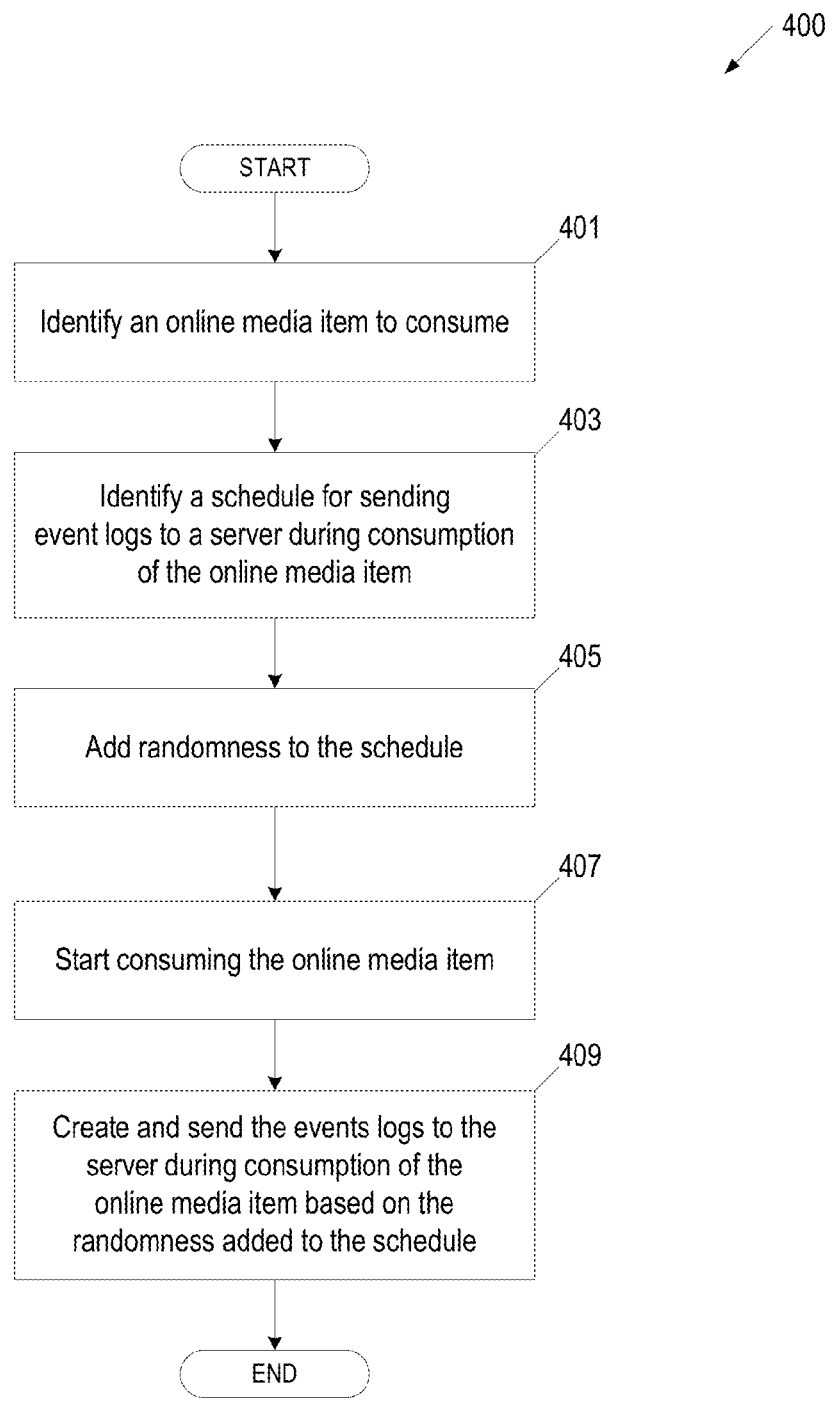
FIG. 4 is flow diagram of an implementation of a method for sending a set of event logs during consumption of an online media item using a random event log schedule.

FIG. 4 is flow diagram of an implementation of a method 400 for sending a set of event logs during consumption of an online media item using a random event log schedule. The method may be performed by processing logic that may comprise hardware (circuitry, dedicated logic, etc.), software (such as is run on a general purpose computer system or a dedicated machine), or a combination of both. In one implementation, the method 400 may be performed by the random event log module 121 hosted by a client device 104A-B of FIG. 1.

At block 401, the client device identifies an online media item to consume. For example, the client device may receive user input selecting Video-ABC. The client device may receive the online media item (e.g., Video-ABC) from a server. At block 403, the client device identifies a schedule for sending a set of event logs to a server. At block 405, the client device adds randomness (jitter) to the schedule. In one implementation, randomness and/or the randomized schedule can be generated on the server-side and sent to the client. The client device can determine which one or more types of randomness to add to the schedule from configuration data that is stored in the data store. For example, the configuration data may specify that the client device should offset the time for sending the first event log. In another example the configuration data may specify that the client device should offset the time for sending one or more subsequent event logs.

At block 407, the client device starts consuming the online media item and creates and sends the event logs to the server based on the randomness added to the schedule at block 409. In implementation, the first event log contains more information than the subsequent event logs to minimize processing and resource usage. For example, the first event log can contain information that would be common to all of the event logs for the set. For example, the first event log may include the identifier of the online media item, geographic location identifier associated with the client device, device platform identifier associated with the client device, and operating system associated with the client device.

Figure 5:
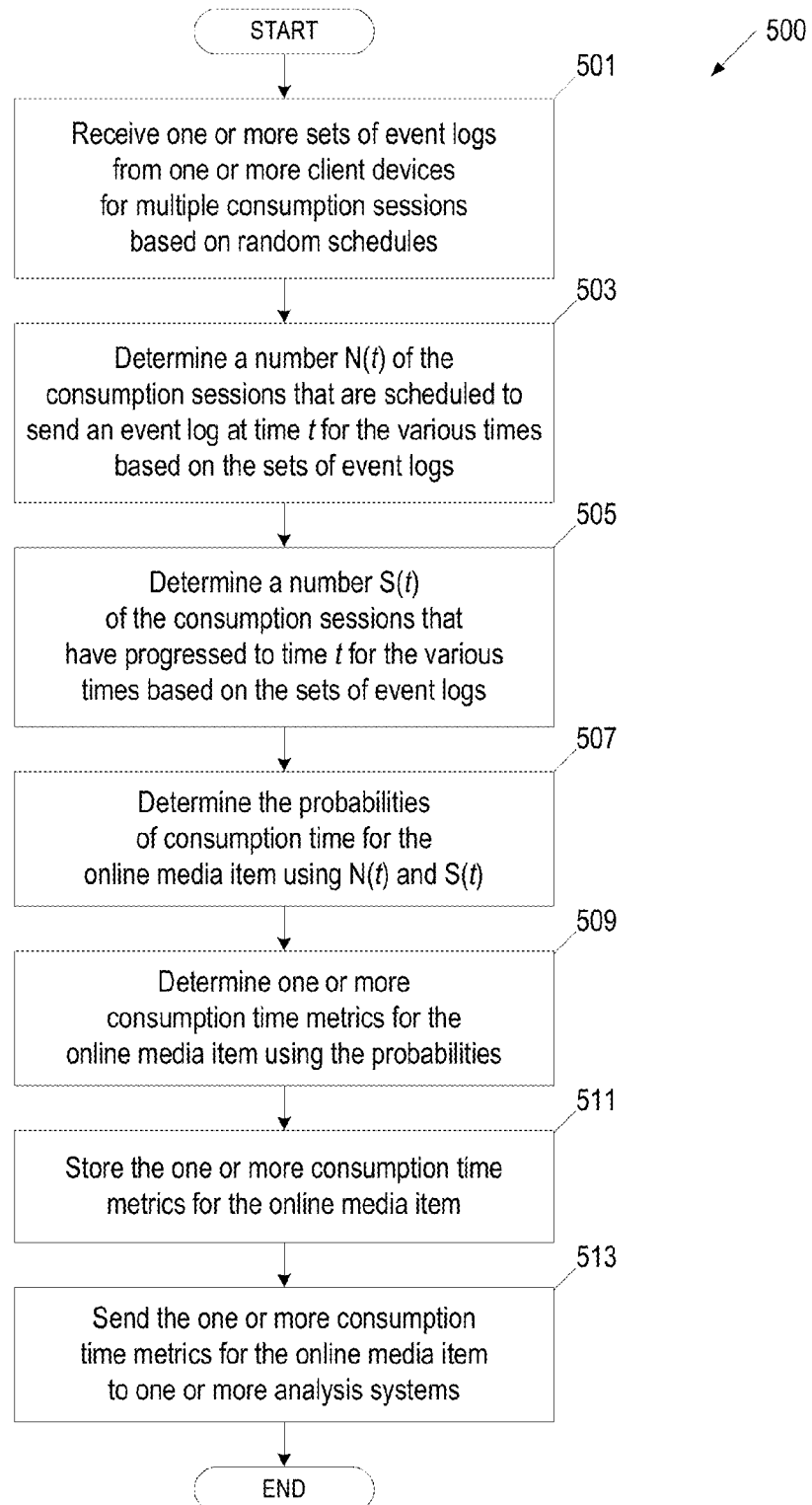
FIG. 5 is flow diagram of an implementation of a method for determining one or more consumption time metrics for an online media item using event logs received based on random schedules.

FIG. 5 is flow diagram of an implementation of a method 500 for determining one or more consumption time metrics for an online media item using random event log schedule. The method may be performed by processing logic that may comprise hardware (circuitry, dedicated logic, etc.), software (such as is run on a general purpose computer system or a dedicated machine), or a combination of both. In one implementation, the method 500 may be performed by the consumption time module 129 hosted by machine 120 of FIG. 1.

At block 501, the server receives one or more sets of event logs for an online media item being consumed by one or more client devices. The sets of event logs are received based on random schedules. A set of event logs corresponds to a consumption session. At block 503, the server extracts data from the event logs, aggregates the extracted data, and determines N(t), the number of consumption sessions that are scheduled to send an event log at time t if the consumption session progresses to time t for various times t. Examples of the extracted data can include, and are not limited to, the time the event log was sent, the time the next event log is scheduled to be sent, the number of segments of the online media item that were consumed since the preceding event log was sent, and length of time for each of those segments. N(t) can be determined from the extracted data from the event logs. For example, Eventlog-1 may be sent at three seconds and can include information that the next event log (e.g., Eventlog-2) is scheduled to be sent at nine seconds. Eventlog-2 may or may be sent at nine seconds depending on whether the consumption session reaches nine seconds or not. For example, the consumption session may end at seven seconds.

At block 505, the server determines S(t), the number of consumption sessions that have actually progressed to time t and sent a corresponding event log from the aggregated data. S(t) can be determined from the extracted data from the event logs. At block 507, the server determines the probabilities of consumption time of t seconds or less for the online media item for various times using N(t) and S(t) and F(t)=Prob (time T≤t)=1−S(t)/N(t) (Equation 2 above). For example, the probability that Video-ABC has a consumption time of forty-eight seconds or less may be F(48)=20%, the probability that Video-ABC has a consumption time of sixty-one seconds or less may be F(61)=50%, and the probability that Video-ABC has a consumption time of seventy seconds or may be F(70)=80%.

At block 509, the server determines one or more consumption time metrics for the online media item based on the probabilities. Examples of a consumption time metric can include, and are not limited to, an average consumption time for the online media item, an average for a subset of event logs for the online media item, etc. The server can aggregate the data (e.g., extracted data) from the sets of event logs by time and/or by one or more parameters (e.g., geography, device platform, etc.). For example, the server may determine an average consumption time for the online media item for a particular device platform that is consuming the online media item, a particular country where the online media item is being consumed, etc.

The server can periodically determine one or more consumption time metrics for the online media item. For example, the server may receive new sets of event logs for an online media item and may add the data from the new sets of event logs to the currently stored data. The server may determine one or more new consumption time metrics for the online media item based on the newly added sets of event logs. The period can be stored as part of configuration data that is stored in data store that is coupled to the server. The period can be a pre-determined and/or user defined period. For example, the period may be once a day, once a week, etc.

At block 511, the server stores the one or more consumption time metrics for the online media item in the data store that is coupled to the server. At block 513, the server sends the one or more consumption time metrics for the online media to one or more analysis systems. For example, a reporting system can receive the probability distribution of the consumption time for a particular online video and can generate a report. In other examples, the average consumption time can be used in determining revenue per consumption time, in editing online media item, in recommending online media items, etc.

Figure 6:
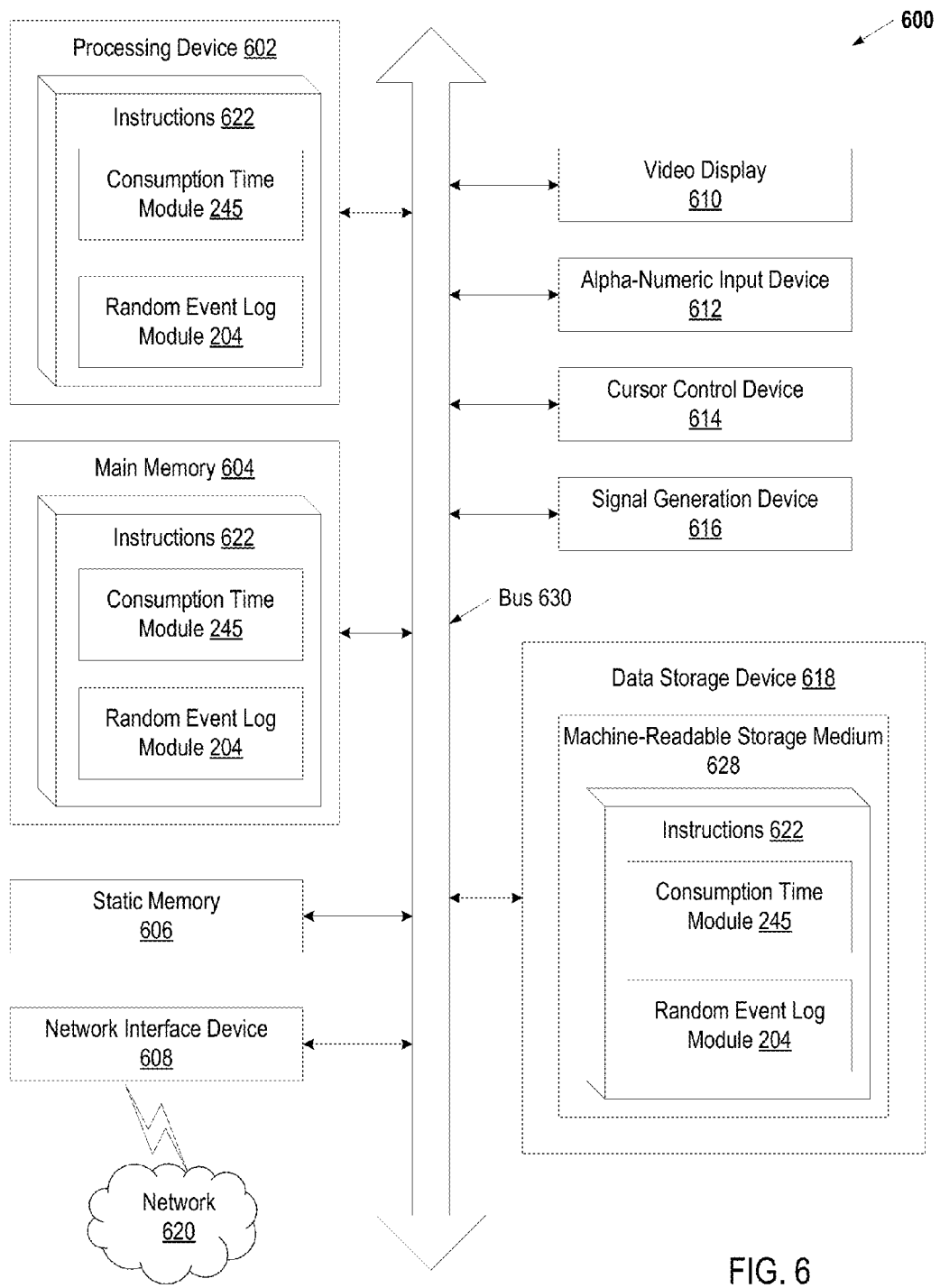
FIG. 6 is a block diagram of an example computer system that may perform one or more of the operations described herein, in accordance with various implementations.

FIG. 6 illustrates a diagram of a machine in an example form of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processing device (processor) 602, a main memory 604 (e.g., read-only memory (ROM), flash memory, dynamic random access memory (DRAM) such as synchronous DRAM (SDRAM), double data rate (DDR SDRAM), or DRAM (RDRAM), etc.), a static memory 606 (e.g., flash memory, static random access memory (SRAM), etc.), and a data storage device 614, which communicate with each other via a bus 630.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 622 for performing the operations and steps discussed herein.

The computer system 600 may further include a network interface device 604. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 614 may include a computer-readable storage medium 624 on which is stored one or more sets of instructions 622 (e.g., software) embodying any one or more of the methodologies or functions described herein. The instructions 622 may also reside, completely or at least partially, within the main memory 604 and/or within the processor 602 during execution thereof by the computer system 600, the main memory 604 and the processor 602 also constituting computer-readable storage media. The instructions 622 may further be transmitted or received over a network 620 via the network interface device 608.

In one implementation, the instructions 622 include instructions for a random event log module (e.g., random event log module 304 in FIG. 3), a consumption time module (e.g., consumption time module 345 of FIG. 3) and/or a software library containing methods that call the random event log module and/or consumption time module. While the computer-readable storage medium 628 (machine-readable storage medium) is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "determining", "calculating", "creating", "sending", "estimating", "adding", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods are depicted and described herein as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain implementations of the present disclosure also relate to an apparatus for performing the operations herein. This apparatus may be constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or." Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method for a server computer system, comprising:
   receiving a plurality of event logs from one or more client devices for a plurality of consumption sessions of an online media item, the plurality of event logs being received based on a plurality of random schedules;
   extracting data from the plurality of event logs to determine, for a plurality of points in time, a first number of consumption sessions during which an event log is scheduled to be sent at corresponding points in time;
   determining from the extracted data, for the plurality of points in time, a second number of consumption sessions during which an event log was sent to the server computer system at the corresponding points in time;
   determining, for each of the plurality of points in time, a probability that consumption time for the online media item is the corresponding point in time or less than the corresponding point in time, the determining being based on the first number and the second number;
   determining one or more consumption time metrics for the online media item based on determined probabilities for the plurality of points in time; and
   creating an analysis report from the one or more consumption time metrics for the online media item.

2. The method of claim 1, wherein the one or more consumption time metrics comprises at least one of an average consumption time for the online media item or an average for a subset of the plurality of sets of event logs for the online media item.

3. The method of claim 1, further comprising:
   creating the plurality of random schedules; and
   sending the plurality of random schedules to the one or more client devices.

4. The method of claim 1, wherein determining the probability for each of the plurality of points in time comprises:
   estimating, for the plurality of points in time, a value for a cumulative distribution function of consumption time at the corresponding points in time using the first number and the second number.

5. A method for a client computer system comprising:
   identifying an event log schedule for sending one or more sets of event logs to a server computer system during consumption of an online media item;
   adding, by a processing device, different types of randomness to the event log schedule; and
   sending the one or more sets of event logs to the server computer system based on the different types of randomness added to the event log schedule.

6. The method of claim 5, wherein the different types of randomness comprises at least one of an offset for a time for sending a first event log or an offset for a time for sending one or more subsequent event logs.

7. The method of claim 5, wherein individual event logs comprise at least one of a time the event log is sent, a time a next event log is scheduled to be sent, an identifier of one or more segments of the online media item consumed since sending a preceding event log, or links to the one or more segments of the online media item consumed since sending the preceding event log.

8. A computer system comprising:
a memory to store a plurality of event logs; and
a processing device coupled with the memory to:
receive the plurality of event logs from one or more client devices for a plurality of consumption sessions of an online media item, the plurality of event logs being received based on a plurality of random schedules;
extracting data from the plurality of event logs to determine, for a plurality of points in time, a first number of consumption sessions during which an event log is scheduled to be sent at corresponding points in time;
determine from the extracted data, for the plurality of points in time, a second number of consumption sessions during which an event log was sent to the server computer system at the corresponding points in time;
determine, for each of the plurality of points in time, a probability that consumption time for the online media item is the corresponding point in time or less than the corresponding point in time, the determining being based on the first number and the second number;
determine one or more consumption time metrics for the online media item based on determined probabilities for the plurality of points in time; and
create an analysis report from the one or more consumption time metrics for the online media item.

9. The system of claim 8, wherein the one or more consumption time metrics comprises at least one of an average consumption time for the online media item or an average for a subset of the plurality of sets of event logs for the online media item.

10. The system of claim 8, wherein to determine the probability for each of the plurality of points in time comprises:
estimating, for the plurality of points in time, a value for a cumulative distribution function of consumption time at the corresponding points in time using the first number and the second number.

11. The system of claim 8, further comprising:
one or more client devices coupled to the computer system via a network, the one or more client devices comprising:
a memory to store an event log schedule for sending one or more sets of event logs to the computer system during consumption of the online media item; and
a processing device coupled to the memory to:
add different types of randomness to the event log schedule; and
send the one or more sets of event logs to the computer system based on the different types of randomness added to the event log schedule.

12. The system of claim 11, wherein the different types of randomness comprises at least one of an offset for a time for sending a first event log or an offset for a time for sending one or more subsequent event logs.

13. The system of claim 11, wherein individual event logs comprise at least one of a time the event log is sent, a time a next event log is scheduled to be sent, an identifier of one or more segments of the online media item consumed since sending a preceding event log, or links to the one or more segments of the online media item consumed since sending the preceding event log.

14. A non-transitory computer readable storage medium encoding instructions thereon that, in response to execution by a processing device, cause the processing device to perform operations comprising:
receiving a plurality of event logs from one or more client devices for a plurality of consumption sessions of an online media item, the plurality of event logs being received based on a plurality of random schedules;
extracting data from the plurality of event logs to determine, for a plurality of points in time, a first number of consumption sessions during which an event log is scheduled to be sent at corresponding points in time;
determining from the extracted data, for the plurality of points in time, a second number of consumption sessions during which an event log was sent to the server computer system at the corresponding points in time;
determining, for each of the plurality of points in time, a probability that consumption time for the online media item is the corresponding point in time or less than the corresponding point in time, the determining being based on the first number and the second number;
determining, by the processing device, one or more consumption time metrics for the online media item based on determined probabilities for the plurality of points in time; and
creating an analysis report from the one or more consumption time metrics for the online media item.

15. The non-transitory computer readable storage medium of claim 14, wherein the one or more consumption time metrics comprises at least one of an average consumption time for the online media item or an average for a subset of the plurality of sets of event logs for the online media item.

16. The non-transitory computer readable storage medium of claim 14, the operations further comprising:
creating the plurality of random schedules; and
sending the plurality of random schedule to the one or more client devices.

17. The non-transitory computer readable storage medium of claim 14, wherein determining the probability for each of the plurality of points in time comprises:
estimating, for the plurality of points in time, a value for a cumulative distribution function of consumption time at the corresponding points in time using the first number and the second number.

18. The non-transitory computer readable storage medium of claim 14, wherein the plurality of random schedules comprise at least one of an offset for a time for sending a first event log or an offset for a time for sending one or more subsequent event logs.

19. The non-transitory computer readable storage medium of 14, further comprising:
identifying an event log schedule for sending one or more sets of event logs during consumption of an online media item;
adding different types of randomness to the event log schedule; and
sending the one or more sets of event logs based on the different types of randomness added to the event log schedule.

20. The non-transitory computer readable storage medium of 14, wherein individual event logs comprise at least one of a time the event log is sent, a time a next event log is scheduled to be sent, an identifier of one or more segments of the online media item consumed since sending a preceding event log, or links to the one or more segments of the online media item consumed since sending the preceding event log.

* * * * *